US012118462B2

(12) United States Patent
Zhuang et al.

(10) Patent No.: US 12,118,462 B2
(45) Date of Patent: Oct. 15, 2024

(54) SYSTEM, METHOD, AND COMPUTER PROGRAM PRODUCT FOR MULTIVARIATE EVENT PREDICTION USING MULTI-STREAM RECURRENT NEURAL NETWORKS

(71) Applicant: Visa International Service Association, San Francisco, CA (US)

(72) Inventors: Zhongfang Zhuang, Sunnyvale, CA (US); Michael Yeh, Palo Alto, CA (US); Liang Wang, San Jose, CA (US); Wei Zhang, Fremont, CA (US); Junpeng Wang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 947 days.

(21) Appl. No.: 17/148,984

(22) Filed: Jan. 14, 2021

(65) Prior Publication Data

US 2021/0224648 A1 Jul. 22, 2021

Related U.S. Application Data

(60) Provisional application No. 62/962,498, filed on Jan. 17, 2020.

(51) Int. Cl.
*G06N 3/08* (2023.01)
*G06N 3/044* (2023.01)
*G06N 3/045* (2023.01)

(52) U.S. Cl.
CPC ............... *G06N 3/08* (2013.01); *G06N 3/044* (2023.01); *G06N 3/045* (2023.01)

(58) Field of Classification Search
CPC .......... G06N 3/08; G06N 3/044; G06N 3/045; G06Q 40/02
See application file for complete search history.

(56) References Cited

U.S. PATENT DOCUMENTS

2018/0365715 A1  12/2018  Malhotra et al.
2019/0354836 A1*  11/2019  Shah ..................... G06N 3/045

FOREIGN PATENT DOCUMENTS

CN  108846692 A   11/2018
WO  2020143409 A1  7/2020

OTHER PUBLICATIONS

Du S, Li T, Horng SJ. Time series forecasting using sequence-to-sequence deep learning framework. In2018 9th international symposium on parallel architectures, algorithms and programming (PAAP) Dec. 26, 2018 (pp. 171-176). IEEE. (Year: 2018).*

(Continued)

*Primary Examiner* — Oluwatosin Alabi
(74) *Attorney, Agent, or Firm* — The Webb Law Firm

(57) ABSTRACT

Described are a system, method, and computer program product for multivariate event prediction using multi-stream recurrent neural networks. The method includes receiving event data from a sample time period and generating feature vectors for each subperiod of each day. The method also includes providing the feature vectors as inputs to a set of first recurrent neural network (RNN) models and generating first outputs for each RNN node. The method further includes merging the first outputs for each same subperiod to form aggregated time-series layers. The method further includes providing the aggregated time-series layers as an input to a second RNN model and generating final outputs for each RNN node of the second RNN model.

20 Claims, 10 Drawing Sheets

(56) References Cited

OTHER PUBLICATIONS

Lai G, Chang WC, Yang Y, Liu H. Modeling long-and short-term temporal patterns with deep neural networks. In The 41st international ACM SIGIR conference on research & development in information retrieval Jun. 27, 2018 (pp. 95-104). (Year: 2018).*

Jurgovsky, J., Granitzer, M., Ziegler, K., Calabretto, S., Portier, P. E., He-Guelton, L. and Caelen, O., 2018. Sequence classification for credit-card fraud detection. Expert systems with applications, 100, pp. 234-245. (Year: 2018).*

Breiman, "Random Forests", Machine Learning, Jan. 2001, pp. 1-33, vol. 45(1).

Cho et al., "Learning Phrase Representations using RNN Encoder-Decoder for Statistical Machine Translation", Sep. 3, 2014, pp. 1-15, arXiv.

Gers et al., "Learning to Forget: Continual Prediction with LSTM", Technical Report IDSIA-01-99, Jan. 1999, pp. 1-19.

Ho, "Random Decision Forests", Proceedings of 3rd International Conference on Document Analysis and Recognition, IEEE, 1995, pp. 278-282.

Salehinejad et al., "Customer Shopping Pattern Prediction: A Recurrent Neural Network Approach", IEEE Symposium Series on Computational Intelligence, IEEE, 2016, pp. 1-6.

Sheil et al., "Predicting purchasing intent: Automatic Feature Learning using Recurrent Neural Networks", arXiv, Jul. 21, 2018, pp. 1-9.

Wen et al., "A Multi-Horizon Quantile Recurrent Forecaster", arXiv, Jun. 28, 2018, pp. 1-9.

Zhang et al., "A Deep Neural Network for Unsupervised Anomaly Detection and Diagnosis in Multivariate Time Series Data", arXiv, Nov. 20, 2018, pp. 1-9.

* cited by examiner

| | RMSE | | | | |
|---|---|---|---|---|---|
| | Department Store | Restaurants | Sports | Medical | Average |
| Linear Model | 3.7006 | 3.7096 | 4.3325 | 3.7536 | 3.8741 |
| Linear Model (L2-regularized) | 3.6999 | 3.7094 | 4.3324 | 3.7532 | 3.8737 |
| Nearest Neighbor | 5.9784 | 5.7083 | 8.6402 | 5.4327 | 6.4399 |
| Random Forest | 3.6918 | 4.2933 | 4.8370 | 3.9903 | 4.2031 |
| RNN (1-layer LSTM) | 3.6920 | 3.8042 | 4.3263 | 3.4097 | 3.8931 |
| RNN (2-layer LSTM) | 3.8138 | 3.7908 | 4.3121 | 3.3720 | 3.9190 |
| RNN (1-layer GRU) | 3.5531 | 3.6632 | 4.3158 | 3.5113 | 3.8726 |
| RNN (2-layer GRU) | 3.8311 | 3.7381 | 4.3193 | 3.4631 | 3.9398 |
| MS-RNN (1-layer LSTM) | 3.5647 | 3.7825 | 4.2409 | 3.8037 | 3.8479 |
| MS-RNN (1-layer GRU) | 3.5521 | 3.7050 | 4.1914 | 3.5186 | 3.7418 |

| | Normalized RMSE | | | | |
|---|---|---|---|---|---|
| | Department Store | Restaurants | Sports | Medical | Average |
| Linear Model | 10.5704 | 5.5397 | 10.2111 | 9.9309 | 9.0630 |
| Linear Model (L2-regularized) | 10.5669 | 5.5393 | 10.2107 | 9.9300 | 9.0617 |
| Nearest Neighbor | 11.0063 | 6.8305 | 11.2740 | 9.5840 | 9.6737 |
| Random Forest | 8.9944 | 6.0096 | 10.5885 | 9.2405 | 8.7082 |
| RNN (1-layer LSTM) | 10.6102 | 5.6537 | 10.1720 | 9.1584 | 9.2342 |
| RNN (2-layer LSTM) | 9.9693 | 5.7273 | 10.2029 | 8.9879 | 9.0963 |
| RNN (1-layer GRU) | 10.2535 | 5.5724 | 10.1210 | 9.6771 | 9.2512 |
| RNN (2-layer GRU) | 10.5512 | 5.6134 | 10.2579 | 9.1511 | 9.2519 |
| MS-RNN (1-layer LSTM) | 10.1082 | 5.4290 | 10.4083 | 8.5998 | 8.6363 |
| MS-RNN (1-layer GRU) | 11.1979 | 5.3735 | 9.5052 | 8.3351 | 8.6029 |

FIG. 10

SYSTEM, METHOD, AND COMPUTER PROGRAM PRODUCT FOR MULTIVARIATE EVENT PREDICTION USING MULTI-STREAM RECURRENT NEURAL NETWORKS

CROSS-REFERENCE TO RELATED APPLICATION

This application claims priority to U.S. Provisional Patent Application No. 62/962,498, titled "System, Method, and Computer Program Product for Multivariate Event Prediction Using Multi-Stream Recurrent Neural Networks," filed Jan. 17, 2020, the disclosure of which is incorporated herein by reference in its entirety.

BACKGROUND

1. Technical Field

Disclosed embodiments or aspects relate generally to machine learning networks and, in one particular embodiment or aspect, to a system, method, and computer program product for multivariate event prediction using multi-stream recurrent neural networks.

2. Technical Considerations

It is advantageous to be able to predict a future pattern of events, e.g., transactions, in order to alter one or more computer systems, e.g., fraud detection systems, to operate most efficiently and effectively. While historical event data may be an indication of future event behavior, there is a need in the art for a more effective system to predict event trends over a recurring time period, e.g., day, week, month, season, year, etc., particularly for more than one predicted variable, e.g., feature of an event. Therefore, there is a need in the art for an improved system and method for multivariate event prediction using historic event data input into machine learning models.

SUMMARY

According to some non-limiting embodiments or aspects, provided is a computer-implemented method for multivariate event prediction. The method may include receiving, with at least one processor, event data associated with a plurality of events occurring in a sample time period. The sample time period may include a plurality of days and each day may include a plurality of subperiods. The method may also include generating, with at least one processor, a plurality of feature vectors for each day. Each feature vector may be associated with a subperiod of a day. Each feature vector may include a plurality of features based on the event data. Generating the plurality of feature vectors may include aggregating, for each respective feature vector, a plurality of values of each feature during a subperiod associated with the respective feature vector. The method may further include providing, with at least one processor, the plurality of feature vectors as inputs to a set of first recurrent neural network (RNN) models. The set of first RNN models may include a first plurality of nodes. The first plurality of nodes may include a plurality of subsets of nodes. Each subset of nodes may be associated with a day and a first RNN model of the set of first RNN models. Each node of a subset of nodes may be associated with a subperiod. Providing the plurality of feature vectors as inputs to the set of first RNN models may include providing each feature vector associated with a subperiod as an input to a respective RNN node of a respective first RNN model.

The method may further include generating, with at least one processor, first outputs for each RNN node of the set of first RNN models. Generating each of the first outputs may include generating a hidden layer feature vector for a hidden layer of each RNN node based on a feature vector that was provided as an input to a respective RNN node. Each of the first outputs may include the hidden layer feature vector. The method may further include merging, with at least one processor, the first outputs for each same subperiod of the plurality of subperiods to form aggregated time-series layers. Each of the aggregated time-series layers may be associated with a subperiod. The method may further include providing, with at least one processor, the aggregated time-series layers as an input to a second RNN model. The second RNN model may include a second plurality of nodes. Each node of the second plurality of nodes may be associated with a subperiod. Providing the aggregated time-series layers as an input to the second RNN model may include providing each of the aggregated time-series layers as an input to a respective RNN node. The method may further include generating, with at least one processor, final outputs for each RNN node of the second RNN model. Generating each of the final outputs may include generating a final hidden layer feature vector for a hidden layer of each RNN node of the second RNN model based on one of the aggregated time-series layers that was provided as an input to a respective RNN node. Each of the final outputs may include the final hidden layer feature vector.

In some non-limiting embodiments or aspects, the subperiod may include an hour and the plurality of subperiods may include twenty-four hours in a day. The method may further include storing, with at least one processor, a plurality of client device addresses in a database of an automatic network communication system. The method may further include receiving, with at least one processor, the event data in the sample time period in response to a prediction request from the automatic network communication system. The method may further include altering, with at least one processor, at least one parameter of the automatic network communication system associated with sending communications to at least one of the plurality of client device addresses in a second time period after the sample time period based on the final outputs.

In some non-limiting embodiments or aspects, the event data may include transaction data. Receiving the event data may include receiving transaction data from a transaction processing system. The plurality of features based on the event data may include at least one of the following: transaction amount; transaction count; items per transaction; or any combination thereof. The method may further include storing, with at least one processor, a plurality of identifiers of transaction accounts in a database of a fraud detection system of the transaction processing system. The method may further include receiving, with at least one processor, the event data in the sample time period in response to a prediction request from the fraud detection system. The event data may include transaction data of completed transactions associated with the transaction accounts. The method may further include altering, with at least one processor, at least one parameter of the fraud detection system based on the final outputs.

In some non-limiting embodiments or aspects, each first RNN model of the set of first RNN models may include a stacked RNN model, wherein each node of the plurality of nodes includes a set of subnodes. Each subnode of the set of subnodes may be associated with a separate RNN model. An input of a first subnode of the set of subnodes may be a feature vector of the plurality of feature vectors. An output of a last subnode of the set of subnodes may be a first output of the first outputs. An output of each subnode of the set of subnodes that is not the last subnode may be an input for another subnode of the set of subnodes.

In some non-limiting embodiments or aspects, the second RNN model may include a shrinking stacked RNN model, wherein a dimension of the final outputs is gradually reduced with each successively generated final output.

According to some non-limiting embodiments or aspects, provided is a system for multivariate event prediction. The system may include a server including at least one processor for executing program instructions. The server may be programmed and/or configured to receive event data associated with a plurality of events occurring in a sample time period. The sample time period may include a plurality of days and each day may include a plurality of subperiods. The server may also be programmed and/or configured to generate a plurality of feature vectors for each day. Each feature vector may be associated with a subperiod of a day. Each feature vector may include a plurality of features based on the event data. Generating the plurality of feature vectors may include aggregating, for each respective feature vector, a plurality of values of each feature during a subperiod associated with the respective feature vector. The server may further be programmed and/or configured to provide the plurality of feature vectors as inputs to a set of first recurrent neural network (RNN) models. The set of first RNN models may include a first plurality of nodes. The first plurality of nodes include a plurality of subsets of nodes. Each subset of nodes may be associated with a day and a first RNN model of the set of first RNN models. Each node of a subset of nodes may be associated with a subperiod. Providing the plurality of feature vectors as inputs to the set of first RNN models may include providing each feature vector associated with a subperiod as an input to a respective RNN node of a respective first RNN model.

The server may further be programmed and/or configured to generate first outputs for each RNN node of the set of first RNN models. Generating each of the first outputs may include generating a hidden layer feature vector for a hidden layer of each RNN node based on a feature vector that was provided as an input to a respective RNN node. Each of the first outputs may include the hidden layer feature vector. The server may further be programmed and/or configured to merge the first outputs for each same subperiod of the plurality of subperiods to form aggregated time-series layers. Each of the aggregated time-series layers may be associated with a subperiod. The server may further be programmed and/or configured to provide the aggregated time-series layers as an input to a second RNN model. The second RNN model may include a second plurality of nodes. Each node of the second plurality of nodes may be associated with a subperiod. Providing the aggregated time-series layers as an input to the second RNN model may include providing each of the aggregated time-series layers as an input to a respective RNN node. The server may further be programmed and/or configured to generate final outputs for each RNN node of the second RNN model. Generating each of the final outputs may include generating a final hidden layer feature vector for a hidden layer of each RNN node of the second RNN model based on one of the aggregated time-series layers that was provided as an input to a respective RNN node. Each of the final outputs may include the final hidden layer feature vector.

In some non-limiting embodiments or aspects, the server may be further programmed and/or configured to store a plurality of client device addresses in a database of an automatic network communication system. The server may be further programmed and/or configured to receive the event data in the sample time period in response to a prediction request from the automatic network communication system. The server may be further programmed and/or configured to alter at least one parameter of the automatic network communication system associated with sending communications to at least one of the plurality of client device addresses in a second time period after the sample time period based on the final outputs.

In some non-limiting embodiments or aspects, the event data may include transaction data. Receiving the event data may include receiving transaction data from a transaction processing system. The plurality of features based on the event data may include at least one of the following: transaction amount; transaction count; items per transaction; or any combination thereof.

In some non-limiting embodiments or aspects, the server may be further programmed and/or configured to store a plurality of identifiers of transaction accounts in a database of a fraud detection system of the transaction processing system. The server may be further programmed and/or configured to receive the event data in the sample time period in response to a prediction request from the fraud detection system. The event data may include transaction data of completed transactions associated with the transaction accounts. The server may be further programmed and/or configured to alter at least one parameter of the fraud detection system based on the final outputs.

In some non-limiting embodiments or aspects, each first RNN model of the set of first RNN models may include a stacked RNN model, wherein each node of the plurality of nodes includes a set of subnodes. Each subnode of the set of subnodes may be associated with a separate RNN model. An input of a first subnode of the set of subnodes may be a feature vector of the plurality of feature vectors. An output of a last subnode of the set of subnodes may be a first output of the first outputs. An output of each subnode of the set of subnodes that is not the last subnode may be an input for another subnode of the set of subnodes.

In some non-limiting embodiments or aspects, the second RNN model may include a shrinking stacked RNN model, wherein a dimension of the final outputs is gradually reduced with each successively generated final output.

According to some non-limiting embodiments or aspects, provided is a computer program product for multivariate event prediction. The computer program product may include at least one non-transitory computer-readable medium including program instructions that, when executed by at least one processor, cause the at least one processor to receive event data associated with a plurality of events occurring in a sample time period. The sample time period may include a plurality of days and each day may include a plurality of subperiods. The program instructions may also cause the at least one processor to generate a plurality of feature vectors for each day. Each feature vector may be associated with a subperiod of a day. Each feature vector may include a plurality of features based on the event data. Generating the plurality of feature vectors may include aggregating, for each respective feature vector, a plurality of values of each feature during a subperiod associated with the respective feature vector. The program instructions may further cause the at least one processor to provide the plurality of feature vectors as inputs to a set of first recurrent neural network (RNN) models. The set of first RNN models may include a first plurality of nodes. The first plurality of nodes may include a plurality of subsets of nodes. Each subset of nodes may be associated with a day and a first RNN model of the set of first RNN models. Each node of a subset of nodes may be associated with a subperiod. Providing the plurality of feature vectors as inputs to the set of first RNN models may include providing each feature vector associated with a subperiod as an input to a respective RNN node of a respective first RNN model.

The program instructions may further cause the at least one processor to generate first outputs for each RNN node of the set of first RNN models. Generating each of the first outputs may include generating a hidden layer feature vector for a hidden layer of each RNN node based on a feature vector that was provided as an input to a respective RNN node. Each of the first outputs may include the hidden layer feature vector. The program instructions may further cause the at least one processor to merge the first outputs for each same subperiod of the plurality of subperiods to form aggregated time-series layers. Each of the aggregated time-series layers may be associated with a subperiod. The program instructions may further cause the at least one processor to provide the aggregated time-series layers as an input to a second RNN model. The second RNN model may include a second plurality of nodes. Each node of the second plurality of nodes may be associated with a subperiod. Providing the aggregated time-series layers as an input to the second RNN model may include providing each of the aggregated time-series layers as an input to a respective RNN node. The program instructions may further cause the at least one processor to generate final outputs for each RNN node of the second RNN model. Generating each of the final outputs may include generating a final hidden layer feature vector for a hidden layer of each RNN node of the second RNN model based on one of the aggregated time-series layers that was provided as an input to a respective RNN node. Each of the final outputs may include the final hidden layer feature vector.

In some non-limiting embodiments or aspects, the program instructions may further cause the at least one processor to store a plurality of client device addresses in a database of an automatic network communication system. The program instructions may further cause the at least one processor to receive the event data in the sample time period in response to a prediction request from the automatic network communication system. The program instructions may further cause the at least one processor to alter at least one parameter of the automatic network communication system associated with sending communications to at least one of the plurality of client device addresses in a second time period after the sample time period based on the final outputs.

In some non-limiting embodiments or aspects, the event data may include transaction data. Receiving the event data may include receiving transaction data from a transaction processing system. The plurality of features based on the event data may include at least one of the following: transaction amount; transaction count; items per transaction; or any combination thereof.

In some non-limiting embodiments or aspects, the program instructions may further cause the at least one processor to store a plurality of identifiers of transaction accounts in a database of a fraud detection system of the transaction processing system. The program instructions may further cause the at least one processor to receive the event data in the sample time period in response to a prediction request from the fraud detection system. The event data may include transaction data of completed transactions associated with the transaction accounts. The program instructions may further cause the at least one processor to alter at least one parameter of the fraud detection system based on the final outputs.

In some non-limiting embodiments or aspects, each first RNN model of the set of first RNN models may include a stacked RNN model. Each node of the plurality of nodes may include a set of subnodes. Each subnode of the set of subnodes may be associated with a separate RNN model. An input of a first subnode of the set of subnodes may be a feature vector of the plurality of feature vectors. An output of a last subnode of the set of subnodes may be a first output of the first outputs. An output of each subnode of the set of subnodes that is not the last subnode may be an input for another subnode of the set of subnodes.

In some non-limiting embodiments or aspects, the second RNN model may include a shrinking stacked RNN model, wherein a dimension of the final outputs is gradually reduced with each successively generated final output.

Other non-limiting embodiments or aspects of the present disclosure will be set forth in the following numbered clauses:

Clause 1: A computer-implemented method for multivariate event prediction, comprising: receiving, with at least one processor, event data associated with a plurality of events occurring in a sample time period, the sample time period comprising a plurality of days and each day comprising a plurality of subperiods; generating, with at least one processor, a plurality of feature vectors for each day, wherein each feature vector is associated with a subperiod of a day, wherein each feature vector comprises a plurality of features based on the event data, wherein generating the plurality of feature vectors comprises aggregating, for each respective feature vector, a plurality of values of each feature during a subperiod associated with the respective feature vector; providing, with at least one processor, the plurality of feature vectors as inputs to a set of first recurrent neural network (RNN) models, wherein the set of first RNN models comprises a first plurality of nodes, wherein the first plurality of nodes comprises a plurality of subsets of nodes, wherein each subset of nodes is associated with a day and a first RNN model of the set of first RNN models, wherein each node of a subset of nodes is associated with a subperiod, wherein providing the plurality of feature vectors as inputs to the set of first RNN models comprises providing each feature vector associated with a subperiod as an input to a respective RNN node of a respective first RNN model; generating, with at least one processor, first outputs for each RNN node of the set of first RNN models, wherein generating each of the first outputs comprises generating a hidden layer feature vector for a hidden layer of each RNN node based on a feature vector that was provided as an input to a respective RNN node, wherein each of the first outputs comprises the hidden layer feature vector; merging, with at least one processor, the first outputs for each same subperiod of the plurality of subperiods to form aggregated time-series layers, wherein each of the aggregated time-series layers is associated with a subperiod; providing, with at least one processor, the aggregated time-series layers as an input to a second RNN model, wherein the second RNN model comprises a second plurality of nodes, wherein each node of the second plurality of nodes is associated with a subperiod, wherein providing the aggregated time-series layers as an input to the second RNN model comprises providing each of the aggregated time-series layers as an input to a respective RNN node; and generating, with at least one processor, final outputs for each RNN node of the second RNN model, wherein generating each of the final outputs comprises generating a final hidden layer feature vector for a hidden layer of each RNN node of the second RNN model based on one of the aggregated time-series layers that was provided as an input to a respective RNN node, wherein each of the final outputs comprises the final hidden layer feature vector.

Clause 2: The computer-implemented method of clause 1, wherein the subperiod comprises an hour and the plurality of subperiods comprises twenty-four hours in a day.

Clause 3: The computer-implemented method of clause 1 or 2, further comprising: storing, with at least one processor, a plurality of client device addresses in a database of an automatic network communication system; receiving, with at least one processor, the event data in the sample time period in response to a prediction request from the automatic network communication system; and altering, with at least one processor, at least one parameter of the automatic network communication system associated with sending communications to at least one of the plurality of client device addresses in a second time period after the sample time period based on the final outputs.

Clause 4: The computer-implemented method of any of clauses 1-3, wherein the event data comprises transaction data, and wherein receiving the event data comprises receiving transaction data from a transaction processing system.

Clause 5: The computer-implemented method of any of clauses 1-4, wherein the plurality of features based on the event data comprises at least one of the following: transaction amount; transaction count; items per transaction; or any combination thereof.

Clause 6: The computer-implemented method of any of clauses 1-5, further comprising: storing, with at least one processor, a plurality of identifiers of transaction accounts in a database of a fraud detection system of the transaction processing system; receiving, with at least one processor, the event data in the sample time period in response to a prediction request from the fraud detection system, wherein the event data comprises transaction data of completed transactions associated with the transaction accounts; and altering, with at least one processor, at least one parameter of the fraud detection system based on the final outputs.

Clause 7: The computer-implemented method of any of clauses 1-6, wherein each first RNN model of the set of first RNN models comprises a stacked RNN model, wherein each node of the plurality of nodes comprises a set of subnodes, wherein each subnode of the set of subnodes is associated with a separate RNN model, wherein an input of a first subnode of the set of subnodes is a feature vector of the plurality of feature vectors, wherein an output of a last subnode of the set of subnodes is a first output of the first outputs, and wherein an output of each subnode of the set of subnodes that is not the last subnode is an input for another subnode of the set of subnodes.

Clause 8: The computer-implemented method of any of clauses 1-7, wherein the second RNN model comprises a shrinking stacked RNN model, wherein a dimension of the final outputs is gradually reduced with each successively generated final output.

Clause 9: A system for multivariate event prediction, the system comprising a server including at least one processor for executing program instructions, the server being programmed and/or configured to: receive event data associated with a plurality of events occurring in a sample time period, the sample time period comprising a plurality of days and each day comprising a plurality of subperiods; generate a plurality of feature vectors for each day, wherein each feature vector is associated with a subperiod of a day, wherein each feature vector comprises a plurality of features based on the event data, wherein generating the plurality of feature vectors comprises aggregating, for each respective feature vector, a plurality of values of each feature during a subperiod associated with the respective feature vector; provide the plurality of feature vectors as inputs to a set of first recurrent neural network (RNN) models, wherein the set of first RNN models comprises a first plurality of nodes, wherein the first plurality of nodes comprises a plurality of subsets of nodes, wherein each subset of nodes is associated with a day and a first RNN model of the set of first RNN models, wherein each node of a subset of nodes is associated with a subperiod, wherein providing the plurality of feature vectors as inputs to the set of first RNN models comprises providing each feature vector associated with a subperiod as an input to a respective RNN node of a respective first RNN model; generate first outputs for each RNN node of the set of first RNN models, wherein generating each of the first outputs comprises generating a hidden layer feature vector for a hidden layer of each RNN node based on a feature vector that was provided as an input to a respective RNN node, wherein each of the first outputs comprises the hidden layer feature vector; merge the first outputs for each same subperiod of the plurality of subperiods to form aggregated time-series layers, wherein each of the aggregated time-series layers is associated with a subperiod; provide the aggregated time-series layers as an input to a second RNN model, wherein the second RNN model comprises a second plurality of nodes, wherein each node of the second plurality of nodes is associated with a subperiod, wherein providing the aggregated time-series layers as an input to the second RNN model comprises providing each of the aggregated time-series layers as an input to a respective RNN node; and generate final outputs for each RNN node of the second RNN model, wherein generating each of the final outputs comprises generating a final hidden layer feature vector for a hidden layer of each RNN node of the second RNN model based on one of the aggregated time-series layers that was provided as an input to a respective RNN node, wherein each of the final outputs comprises the final hidden layer feature vector.

Clause 10: The system of clause 9, wherein the server is further programmed and/or configured to: store a plurality of client device addresses in a database of an automatic network communication system; receive the event data in the sample time period in response to a prediction request from the automatic network communication system; and alter at least one parameter of the automatic network communication system associated with sending communications to at least one of the plurality of client device addresses in a second time period after the sample time period based on the final outputs.

Clause 11: The system of clause 9 or 10, wherein the event data comprises transaction data, wherein receiving the event data comprises receiving transaction data from a transaction processing system, and wherein the plurality of features based on the event data comprises at least one of the following: transaction amount; transaction count; items per transaction; or any combination thereof.

Clause 12: The system of any of clauses 9-11, wherein the server is further programmed and/or configured to: store a plurality of identifiers of transaction accounts in a database of a fraud detection system of the transaction processing system; receive the event data in the sample time period in response to a prediction request from the fraud detection system, wherein the event data comprises transaction data of completed transactions associated with the transaction accounts; and alter at least one parameter of the fraud detection system based on the final outputs.

Clause 13: The system of any of clauses 9-12, wherein each first RNN model of the set of first RNN models comprises a stacked RNN model, wherein each node of the plurality of nodes comprises a set of subnodes, wherein each subnode of the set of subnodes is associated with a separate RNN model, wherein an input of a first subnode of the set of subnodes is a feature vector of the plurality of feature vectors, wherein an output of a last subnode of the set of subnodes is a first output of the first outputs, and wherein an output of each subnode of the set of subnodes that is not the last subnode is an input for another subnode of the set of subnodes.

Clause 14: The system of any of clauses 9-13, wherein the second RNN model comprises a shrinking stacked RNN model, wherein a dimension of the final outputs is gradually reduced with each successively generated final output.

Clause 15: A computer program product for multivariate event prediction, the computer program product comprising at least one non-transitory computer-readable medium including program instructions that, when executed by at least one processor, cause the at least one processor to: receive event data associated with a plurality of events occurring in a sample time period, the sample time period comprising a plurality of days and each day comprising a plurality of subperiods; generate a plurality of feature vectors for each day, wherein each feature vector is associated with a subperiod of a day, wherein each feature vector comprises a plurality of features based on the event data, wherein generating the plurality of feature vectors comprises aggregating, for each respective feature vector, a plurality of values of each feature during a subperiod associated with the respective feature vector; provide the plurality of feature vectors as inputs to a set of first recurrent neural network (RNN) models, wherein the set of first RNN models comprises a first plurality of nodes, wherein the first plurality of nodes comprises a plurality of subsets of nodes, wherein each subset of nodes is associated with a day and a first RNN model of the set of first RNN models, wherein each node of a subset of nodes is associated with a subperiod, wherein providing the plurality of feature vectors as inputs to the set of first RNN models comprises providing each feature vector associated with a subperiod as an input to a respective RNN node of a respective first RNN model; generate first outputs for each RNN node of the set of first RNN models, wherein generating each of the first outputs comprises generating a hidden layer feature vector for a hidden layer of each RNN node based on a feature vector that was provided as an input to a respective RNN node, wherein each of the first outputs comprises the hidden layer feature vector; merge the first outputs for each same subperiod of the plurality of subperiods to form aggregated time-series layers, wherein each of the aggregated time-series layers is associated with a subperiod; provide the aggregated time-series layers as an input to a second RNN model, wherein the second RNN model comprises a second plurality of nodes, wherein each node of the second plurality of nodes is associated with a subperiod, wherein providing the aggregated time-series layers as an input to the second RNN model comprises providing each of the aggregated time-series layers as an input to a respective RNN node; and generate final outputs for each RNN node of the second RNN model, wherein generating each of the final outputs comprises generating a final hidden layer feature vector for a hidden layer of each RNN node of the second RNN model based on one of the aggregated time-series layers that was provided as an input to a respective RNN node, wherein each of the final outputs comprises the final hidden layer feature vector.

Clause 16: The computer program product of clause 15, wherein the program instructions further cause the at least one processor to: store a plurality of client device addresses in a database of an automatic network communication system; receive the event data in the sample time period in response to a prediction request from the automatic network communication system; and at least one parameter of the automatic network communication system associated with sending communications to at least one of the client device addresses in a second time period after the sample time period based on the final outputs.

Clause 17: The computer program product of clause 15 or 16, wherein the event data comprises transaction data, wherein receiving the event data comprises receiving transaction data from a transaction processing system, and wherein the plurality of features based on the event data comprises at least one of the following: transaction amount; transaction count; items per transaction; or any combination thereof.

Clause 18: The computer program product of any of clauses 15-17, wherein the program instructions further cause the at least one processor to: store a plurality of identifiers of transaction accounts in a database of a fraud detection system of the transaction processing system; receive the event data in the sample time period in response to a prediction request from the fraud detection system, wherein the event data comprises transaction data of completed transactions associated with the transaction accounts; and alter at least one parameter of the fraud detection system based on the final outputs.

Clause 19: The computer program product of any of clauses 15-18, wherein each first RNN model of the set of first RNN models comprises a stacked RNN model, wherein each node of the plurality of nodes comprises a set of subnodes, wherein each subnode of the set of subnodes is associated with a separate RNN model, wherein an input of a first subnode of the set of subnodes is a feature vector of the plurality of feature vectors, wherein an output of a last subnode of the set of subnodes is a first output of the first outputs, and wherein an output of each subnode of the set of subnodes that is not the last subnode is an input for another subnode of the set of subnodes.

Clause 20: The computer program product of any of clauses 15-19, wherein the second RNN model comprises a shrinking stacked RNN model, wherein a dimension of the final outputs is gradually reduced with each successively generated final output.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 10 is a table of experimentation performance results of non-limiting embodiments or aspects of a system and method for multivariate event prediction using multi-stream RNN.

DETAILED DESCRIPTION

Figure 1:
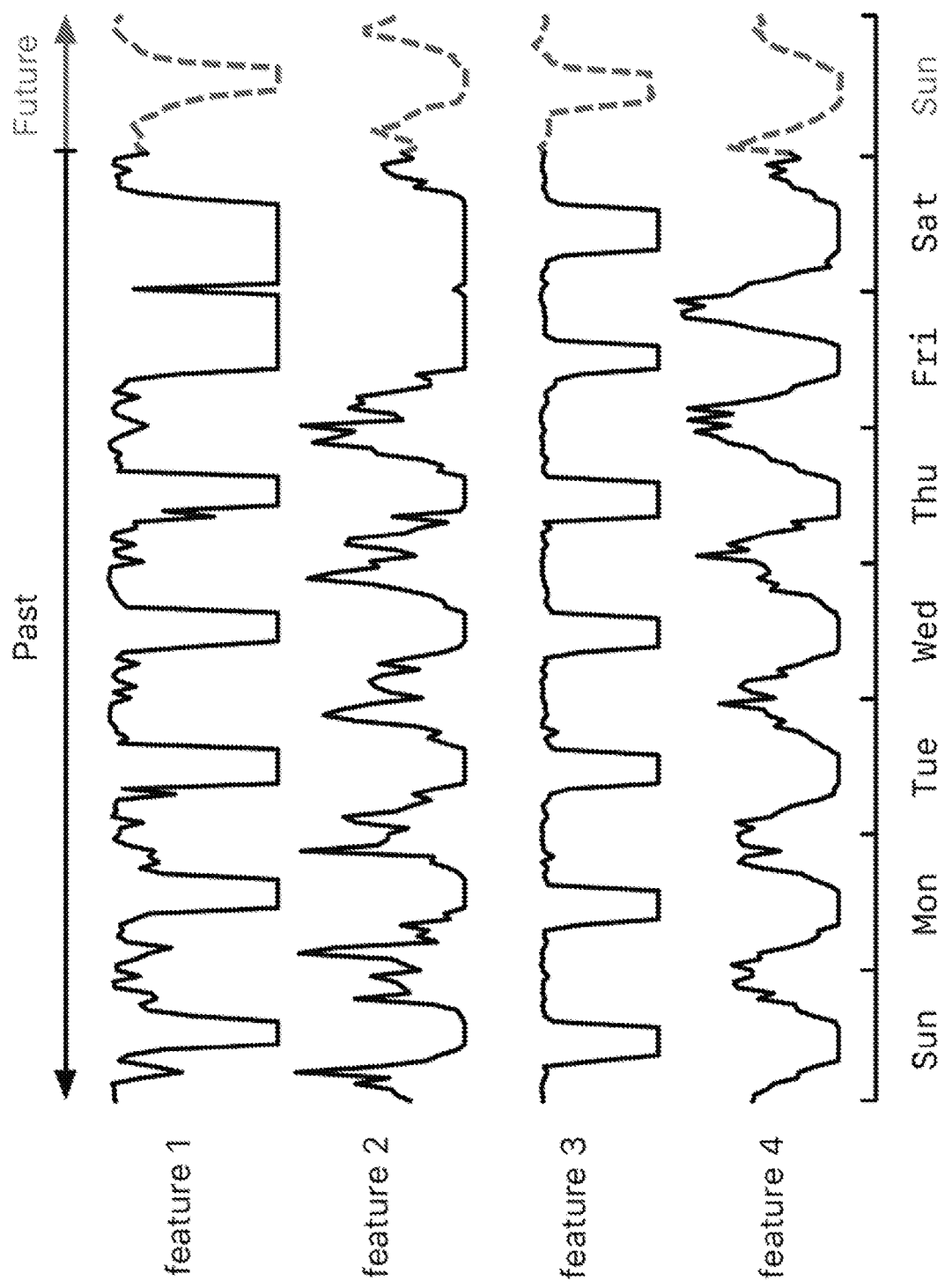
FIG. 1 is an illustration of a plot of historic event data and predicted event data, according to a non-limiting embodiment or aspect of a system and method for multivariate event prediction using multi-stream recurrent neural networks (RNN)

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" or "transaction processing system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction. A transaction account may include a debit account, a credit account, a savings account, and/or the like.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for multivariate event prediction using multi-stream recurrent neural networks. Described embodiments and aspects improve upon prior art technical solutions by more accurately modeling and predicting event behavior over future time periods. Predicting future event behavior accurately allows all computer systems that rely on such predictions to use fewer computer resources and increase efficiency, e.g., by generating and sending communications only to relevant recipients who are predicted to be receptive/responsive to the communication. For deployment of the described systems and methods in a fraud detection context, system security is improved by identifying trends indicative of irregular behavior, as compared to the predicted behavior. For deployment of the described systems and methods in a context of automatic network communication systems (e.g., advertisement servers, recommendation servers, notification servers, etc.), fewer unnecessary communications may be sent, as communications will be targeted only to the most likely receptive/responsive recipients. Such efficiencies reduce computer resources (e.g., processing speed, memory storage, bandwidth, number of communications, etc.) dedicated to transmitting automatic network communications. The described processes outperform existing baseline methods under various configurations.

Technical Improvements

It will be appreciated that the described systems and methods may provide technical improvements to any event data-driven, computer-modeled system. In some non-limiting embodiments or aspects, the event data may be transaction data. Digital payment systems enable billions of electronic transactions to be processed every second. One challenge these systems face is detecting irregular behaviors of merchant transactions that deviate from the historical data. While many of these deviations may be harmless, some may signal serious underlying issues, including, but not limited to, network connection issues between POS devices and transaction processing systems, stolen payment devices, money laundering, and/or the like. Thus, detecting deviated behaviors is an important task for both merchants and payment processing companies.

Event data in real-world applications may be composed of multiple features. In the example of transaction data, features may include, but not limited to, transaction amount, number of transactions in the past hour, and/or the like. For a given period of time (e.g., a week), each feature may be represented as a time series. FIG. 1 depicts an example of event data evaluated as a time series, broken down by seven days over the course of a week, illustrating the patterns of change in features of the event data. Historic feature values of event data is represented by the "Past" section of the illustration, and such historic event data is used as an input to the described models herein. Future feature values of event data is represented by the "Future" section of the illustration, and such future event data is generated as an output from the described models herein.

Described systems and methods use a multi-stream recurrent neural network (RNN) model to provide for future event prediction, e.g., merchant transaction prediction. As described herein, the method includes aggregating event data at a fine granularity (e.g., day) and then augmenting the event data with another RNN to capture the pattern at a higher level of granularity. Described systems and methods summarize and preserve as much event information as possible for future long-term predictions.

Model

Figure 2:
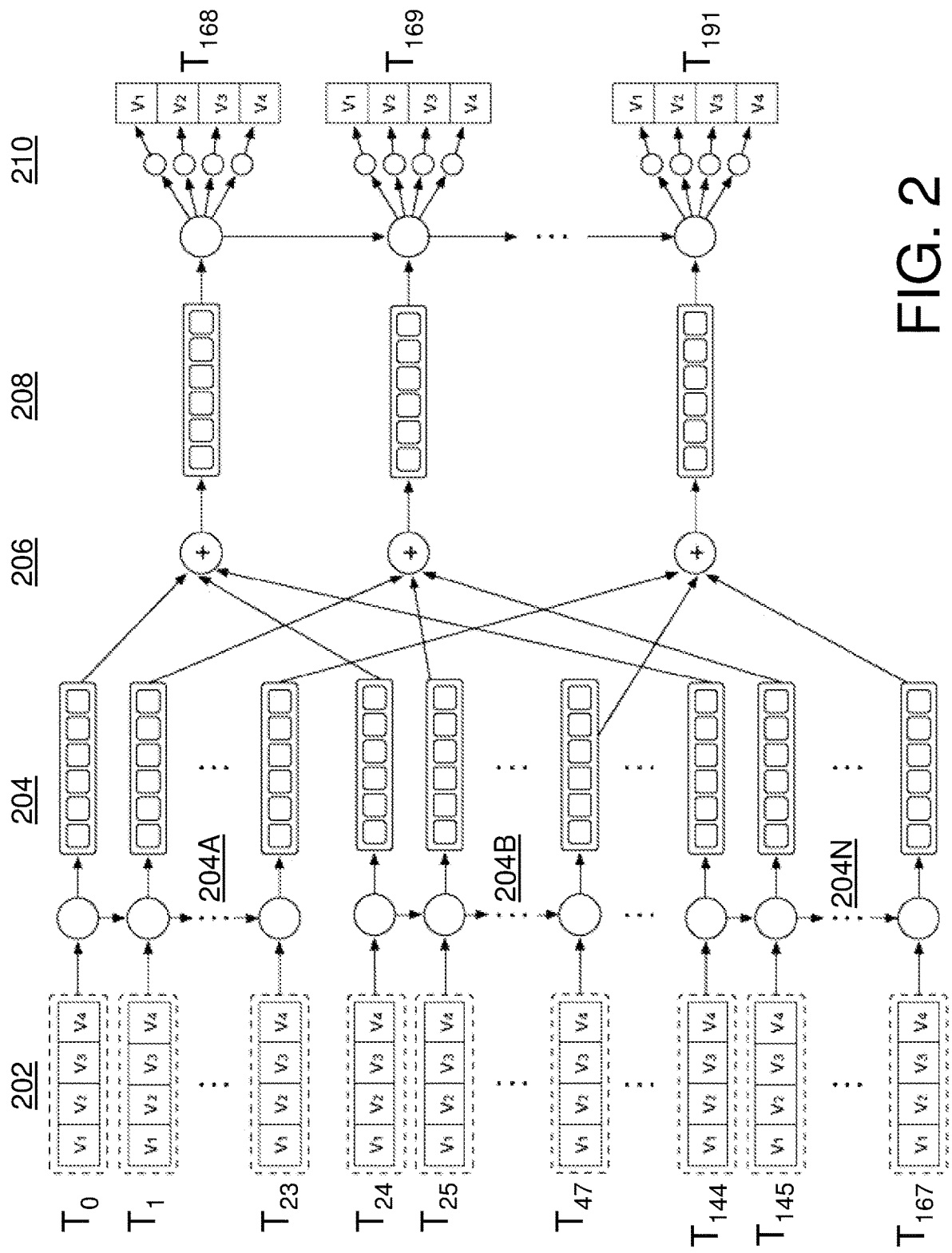
FIG. 2 is a schematic diagram of a model according to a non-limiting embodiment or aspect of a system and method for multivariate event prediction using multi-stream RNN.

With specific reference to FIG. 2, and in some non-limiting embodiments or aspects, provided is a schematic diagram illustrating the structure of a model for use in described systems and methods. The model may be executed on one or more processors of one or more computing devices. The model may sample event data from a sample time period (e.g., a week) based on event data of a series of subperiods (e.g., hours) that may be grouped (e.g., into days). The depicted example of the model illustrates the aggregation of event data over a series of subperiods (e.g., 168 hours, $T_0 \sim T_{167}$), and the prediction of values of a next series of subperiods (e.g., 24 hours, $T_{168} \sim T_{191}$). In step 202, the model receives and aggregates event data (e.g., in a feature vector format, such as having aggregate values $V_1$, $V_2$, $V_3$, $V_4$, etc.) for each subperiod (e.g., each hour $T_n$).

In step 204, the model inputs the event data into a RNN for each group of subperiods. For example, where the subperiods are hours, the grouping of subperiods may be a day. As shown, a first RNN 204A is applied for the event data of the first day (e.g., $T_0 \sim T_{23}$), a second RNN 204B is applied for the event data of a second day (e.g., $T_{24} \sim T_{47}$), and an nth RNN 204N is applied for the event data of an nth day (e.g., $T_{144} \sim T_{167}$). In step 206, the model merges the layers of each RNN 204A-204N. Each merge layer is configured to aggregate the event data from each subperiod (e.g., hour) in the sample time period (e.g., week). In step 208, the model inputs the merged layers of step 206 into an additional RNN. The additional RNN connects to the previous merge layers to capture the high-level patterns in the sample time period. In step 210, the model outputs the fully connected layers to make predictions for each feature of the event data individually.

Multi-Stream RNN

With further reference to FIG. 2, the model of described systems and methods is a multi-stream RNN, which provides for the determination of time series patterns in a sample time period. The RNN may make use of gated recurrent units (GRU) or long short-term memory (LSTM). Each RNN may be represented by the following formula:

$$h_i^{(t)} = RNN_i(x_t) \qquad \text{Formula 1}$$

where $x_t$ denotes the values of event data features at time t, $RNN_i$ is the i-th RNN in the multi-stream schema and $h_i^{(t)}$ is the latent representation of the time series of the i-th group (e.g., day) of the sample time period (e.g., week). For example, $RNN_1$ 204A may be only responsible for processing $T_0 \sim T_{23}$ event data.

Each RNN used may have the same number of hidden dimensions. A dropout layer may be augmented after each RNN with a fixed dropout rate (e.g., 0.2). The hidden states $h_i^{(t)}$ may be aggregated by merge layers of step 206 to preserve the patterns across every subperiod (e.g., hour) of each group (e.g., day). For subperiods of hours that are grouped by day, the following formula may be used:

$$s_t = h_0^{(t)} + h_1^{(t)} + \ldots + h_6^{(t)} \qquad \text{Formula 2}$$

where $t \in [0,23]$ and $h_0^{(t)} \sim h_6^{(t)}$ are the patterns of a given hour of one day in the week.

On a higher level, the additional RNN of step 208 provides for the determination of patterns across every subperiod, which may be represented by the following formula:

$$h_s^{(t)} = RNN_S(s_t) \qquad \text{Formula 3}$$

The model utilizes $h_s^{(t)}$ to predict the future values of each future subperiod (e.g., hour) by augmenting fully connected layers to $RNN_s$, in step 210. Instead of predicting values of all features at once, the model may utilize separated linear fully connected layers to predict every feature individually. These fully connected layers may be represented by the following formula:

$$v_k^{(t)} = W_k s_t + b_k \qquad \text{Formula 4}$$

where $W_k$ is the weight matrix and $b_k$ is the bias term of the fully connected layer.

Stacked RNN

Figure 3:
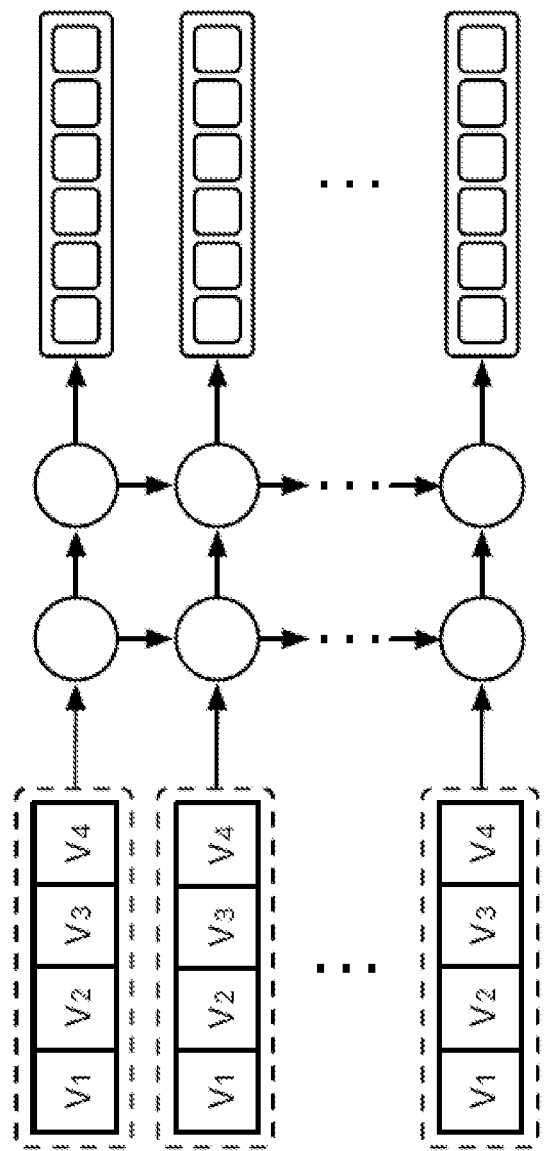
FIG. 3 is a schematic diagram of a portion of a model according to a non-limiting embodiment or aspect of a system and method for multivariate event prediction using multi-stream RNN.

With specific reference to FIG. 3, and in some non-limiting embodiments or aspects, stacked RNN may be used in the above-described model for event data input, prior to merging. Complicated time series data may require a more complicated RNN structure, such as stacked RNN, to capture the patterns. Thus, the input RNN layers from step 202 into step 204 of FIG. 2 may be replaced by stacked RNN layers, as shown in FIG. 3.

Shrink Stacked RNN

Figure 4:
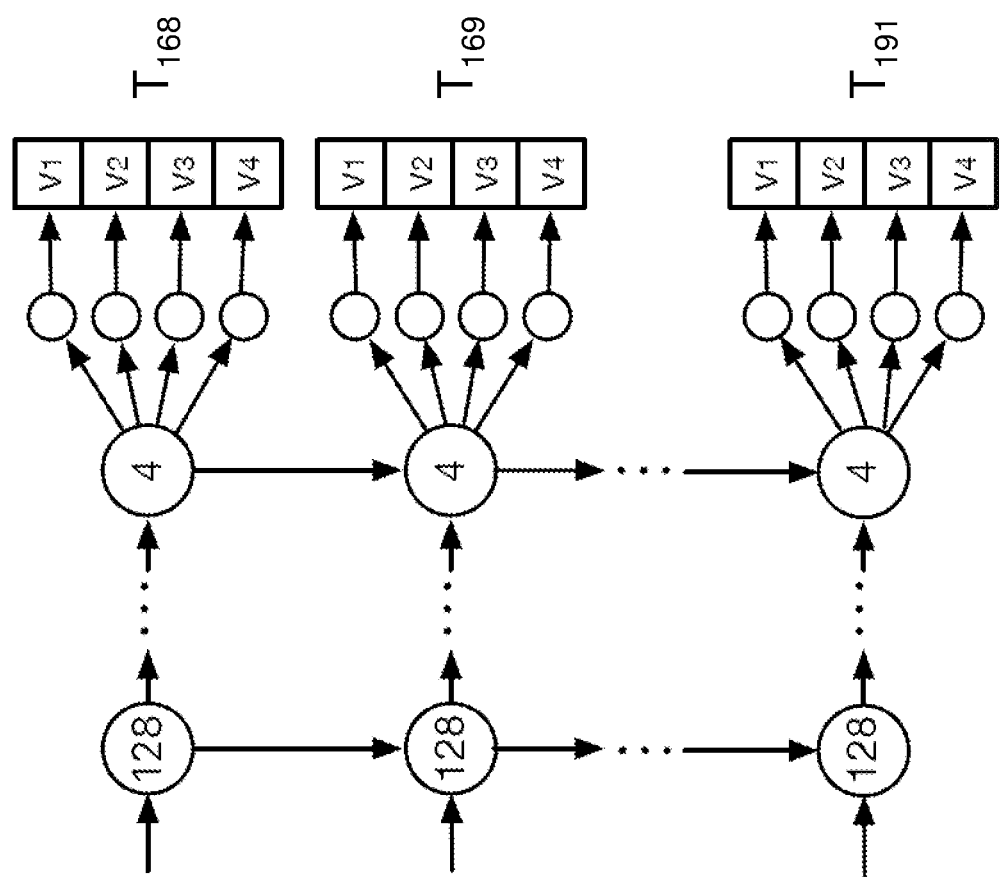
FIG. 4 is a schematic diagram of a portion of a model according to a non-limiting embodiment or aspect of a system and method for multivariate event prediction using multi-stream RNN.

With specific reference to FIG. 4, and in some non-limiting embodiments or aspects, shrink stacked RNN may be used in the above-described model for prediction output. The additional RNN of step 208 in FIG. 2 may include various RNN layers to gradually reduce the dimensionality of the RNN layers. The dimensions of each output layer may be shrunk using the following rule:

Formula 5

$$d_{i+1} = \begin{cases} \lfloor d_i/r \rfloor, & \text{otherwise} \\ m, & \text{if } \lfloor d_i/r \rfloor = 0 \end{cases}$$

where $d_{i+1}$ and $d_i$ are dimensions of the i+1-th and i-th layers, respectively. Further, r represents the rate of shrinkage and m is the minimal dimension of this stack when $[d_i/r]=0$. This ensures the last output RNN layer has a valid number of dimensions. The above process is schematically illustrated for output layers of $T_{168}$~$T_{191}$ in FIG. 4.

Environment

Figure 5:
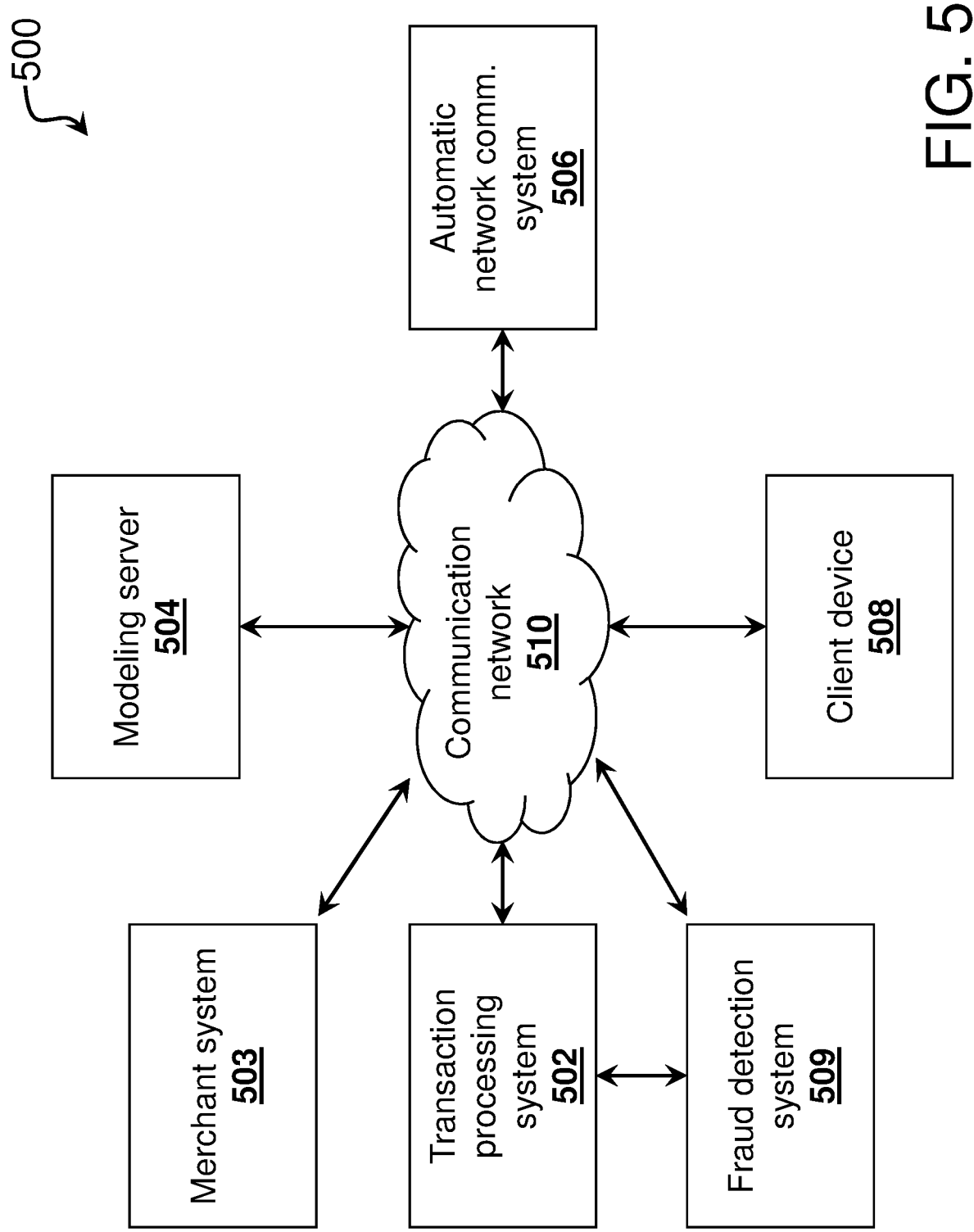
FIG. 5 is a schematic diagram of an environment according to a non-limiting embodiment or aspect of a system and method for multivariate event prediction using multi-stream RNN.

Referring now to FIG. 5, FIG. 5 is a diagram of an example environment 500 in which devices, systems, methods, and/or products described herein may be implemented. As shown in FIG. 5, environment 500 may include a transaction processing system 502, a merchant system 503, a modeling server 504, an automatic network communication system 506 (e.g., one or more servers configured to communicate with client devices 508 through the communication network 510 according to predetermined parameters), one or more client devices 508, and a fraud detection system 509 (which may be communicatively connected to and/or included within the transaction processing system 502). The transaction processing system 502, merchant system 503, modeling server 504, automatic network communication system 506, client device 508, and fraud detection system 509 may interconnect (e.g., establish a connection to communicate) via wired connections, wireless connections, or a combination of wired and wireless connections.

Transaction processing system 502 may include one or more devices capable of being in communication with merchant system 503, modeling server 504, automatic network communication system 506, client device 508, and/or fraud detection system 509, via communication network 510. For example, transaction processing system 502 may include one or more computing devices, such as one or more servers, one or more databases (e.g., one or more transaction databases associated with a processing transactions), and/or the like. In some non-limiting embodiments or aspects, transaction processing system 502 may be associated with a transaction service provider, as described herein.

Merchant system 503 may include one or more devices capable of being in communication with transaction processing system 502, modeling server 504, automatic network communication system 506, client device 508, and/or fraud detection system 509, via communication network 510. For example, merchant system 503 may include one or more computing devices, such as one or more mobile devices, one or more smartphones, one or more wearable devices, one or more POS devices, one or more servers, one or more databases (e.g., one or more merchant databases associated with a merchant), and/or the like. In some non-limiting embodiments or aspects, merchant system 503 may communicate via a short-range wireless communication connection. In some non-limiting embodiments or aspects, merchant system 503 may be associated with a merchant, as described herein.

Modeling server 504 may include one or more devices capable of being in communication with transaction processing system 502, merchant system 503, automatic network communication system 506, client device 508, and/or fraud detection system 509, via communication network 510. For example, modeling server 504 may include one or more computing devices, such as one or more servers, one or more databases (e.g., one or more machine learning databases associated with a storing event data, machine learning model configurations, etc.), and/or the like. In some non-limiting embodiments or aspects, modeling server 504 may be associated with a transaction service provider, as described herein.

Automatic network communication system 506 may include one or more devices capable of being in communication with transaction processing system 502, merchant system 503, modeling server 504, client device 508, and/or fraud detection system 509, via communication network 510. For example, automatic network communication system 506 may include one or more computing devices, such as one or more servers, one or more databases (e.g., client device address database for sending communications, transaction account identifier database for tracking accounts, system configuration database, etc.), and/or the like. In some non-limiting embodiments or aspects, automatic network communication system 506 may be associated with a transaction service provider, as described herein.

Client device 508 may include one or more devices capable of being in communication with transaction processing system 502, merchant system 503, modeling server 504, automatic network communication system 506, and/or fraud detection system 509, via communication network 510. For example, client device 508 may include one or more devices, such as one or more payment devices, one or more mobile devices, one or more smartphones, one or more wearable devices (e.g., watches, glasses, lenses, clothing, and/or the like), and/or the like. In some non-limiting embodiments or aspects, client device 508 may be capable of communicating via a short-range wireless communication connection (e.g., a wireless communication connection for communicating information in a range between 2 to 3 centimeters to 5 to 6 meters, such as an NFC communication connection, an RFID communication connection, a Bluetooth® communication connection, and/or the like). In some non-limiting embodiments or aspects, client device 508 may be associated with a user as described herein.

Fraud detection system 509 may include one or more devices capable of being in communication with transaction processing system 502, merchant system 503, modeling server 504, automatic network communication system 506, and/or client device 508, via communication network 510. For example, fraud detection system 506 may include one or more computing devices, such as one or more servers, one or more databases (e.g., client device address database for sending communications, transaction account identifier database for tracking accounts, fraud model configuration database, etc.), and/or the like. In some non-limiting embodiments or aspects, fraud detection system 509 may be associated with a transaction service provider, as described herein.

In some non-limiting embodiments or aspects, a transaction processing network may include a plurality of systems in a communication path for processing a transaction. For example, a transaction processing network may include merchant system 503, a payment gateway service provider system, an acquirer system, transaction processing system 502, and/or an issuer system in a communication path (e.g., a communication path, a communication channel, a communication network, and/or the like) for processing an electronic payment transaction. As an example, a transaction processing network may process (e.g., initiate, conduct, authorize, and/or the like) an electronic payment transaction via the communication path between merchant system 503, a payment gateway service provider system, an acquirer system, transaction processing system 502, and/or issuer system.

Communication network 510 may include one or more wired and/or wireless networks. For example, communication network 510 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 5 are provided as an example. There can be additional systems, devices, and/or networks, fewer systems, devices, and/or networks, different systems, devices, and/or networks, or differently arranged systems, devices, and/or networks than those shown in FIG. 5. Furthermore, two or more systems or devices shown in FIG. 5 can be implemented within a single system or a single device, or a single system or a single device shown in FIG. 5 can be implemented as multiple, distributed systems or devices. Additionally, or alternatively, a set of systems or a set of devices (e.g., one or more systems, one or more devices) of environment 500 can perform one or more functions described as being performed by another set of systems or another set of devices of environment 500.

In some non-limiting embodiments or aspects, transaction data may include transaction parameters associated with transactions, such as payment transactions initiated and/or conducted with an electronic wallet application, and/or the like. Non-limiting examples of transaction parameters include: electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like.

With further reference to FIG. 5, the modeling server 504 may receive event data associated with a plurality of events occurring in a sample time period (e.g., a week). The sample time period may include a plurality of days and each day may include a plurality of subperiods (e.g., hours). The modeling server 504 may generate a plurality of feature vectors for each day. Each feature vector may be associated with a subperiod of a day and may include a plurality of features based on the event data. Each feature vector may be generated by aggregating a plurality of values of each feature in the feature vector during a subperiod associated with the respective feature vector. To illustrate, in some non-limiting embodiments or aspects, event data may be transaction data, transaction amount maybe a feature of the transaction data, and a feature vector for a subperiod of an hour may include aggregating the value of transaction amounts of transactions occurring in the hour.

The modeling server 504 may provide the plurality of feature vectors as inputs to a set of first recurrent RNN models. The set of first RNN models may include a first plurality of nodes. The first plurality of nodes may include a plurality of subsets of nodes. Each subset of nodes may be associated with a day and a RNN model for the respective day, from the set of first RNN models. Each node of the subset of nodes may be associated with a subperiod (e.g., hour). Providing the plurality of feature vectors as inputs includes providing each feature vector associated with a subperiod as an input to a respective RNN node of a respective first RNN model. This process is further illustrated in steps 202 and 204 of FIG. 2, discussed above.

The modeling server 504 may generate first outputs for each RNN node of the set of first RNN models. Generating each of the first outputs may include generating a hidden layer feature vector for a hidden layer of each RNN node based on a feature vector that was provided as an input to a respective RNN node. Each of the first outputs may include the hidden layer feature vector. This process is further illustrated in step 204 of FIG. 2, discussed above.

The modeling server 504 may merge the first outputs for each same subperiod of the plurality of subperiods to form aggregated time-series layers. For example, for a subperiod delineated by an hour, outputs across RNNs corresponding to a same hour (e.g., data from 12 pm-1 pm) may be merged. Each of the aggregated time-series layers may be associated with a subperiod. This process is further illustrated in step 206 of FIG. 2, discussed above.

The modeling server 504 may provide the aggregated time-series layers as an input to a second RNN model. The second RNN model may include a second plurality of nodes. Each plurality of nodes may be associated with a subperiod. Providing the aggregated time-series layers as an input to the second RNN model may include providing each of the aggregated time-series layers as an input to a respective RNN node. This process is further illustrated in step 208 of FIG. 2, discussed above.

The modeling server 504 may generate final outputs for each RNN node of the second RNN model. Generating each of the final outputs may include generating a final hidden layer feature vector for a hidden layer of each RNN node of the second RNN model based on one of the aggregated time-series layers that was provided as an input to a respective RNN node. Each of the final outputs may include the final hidden layer feature vector. This process is further illustrated in step 210 of FIG. 2, discussed above.

Figure 6:
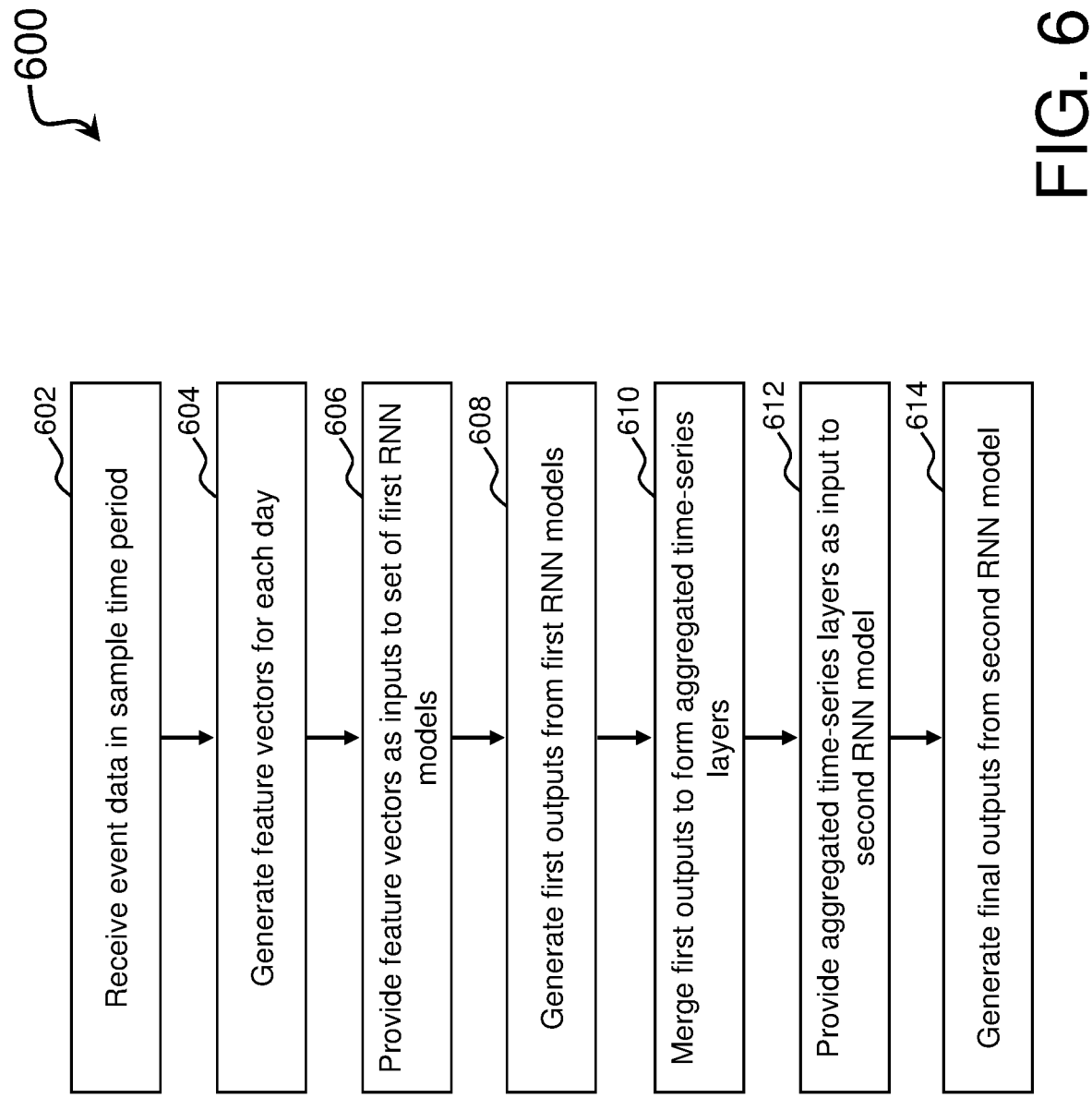
FIG. 6 is a process diagram according to a non-limiting embodiment or aspect of a system and method for multivariate event prediction using multi-stream RNN.

With specific reference to FIG. 6, and in some non-limiting embodiments or aspects, provided is a process 600 for multivariate event prediction using multi-stream RNN. One or more steps of process 600 may be performed (e.g., completely, partially, and/or the like) by transaction processing system 502, merchant system 503, modeling server 504, automatic network communication system 506, and/or fraud detection system 509. In some non-limiting embodiments or aspects, one or more of the steps of process 600 may be performed (e.g., completely, partially, and/or the like) by another device or group of devices separate from and/or including transaction processing system 502, merchant system 503, modeling server 504, automatic network communication system 506, and/or fraud detection system 509.

As shown in FIG. 6, at step 602, event data in a sample time period may be received. For example, the modeling server 504 may receive event data associated with a plurality of events (e.g., transactions) occurring in a sample time period. The sample time period may include a plurality of days. Each day may include a plurality of subperiods (e.g., minutes, hours, other time ranges, etc.). A plurality of subperiods may or may not span an entire day (e.g., 24 hours in a day, 6 hours in a day, etc.).

At step 604, feature vectors may be generated. For example, the modeling server 504 may generate a plurality of feature vectors (e.g., sets of quantifiable event features) for each day. In some non-limiting embodiments or aspects, event data may include transaction data, and transaction data features may include, but are not limited to, transaction amount, transaction count, number of transactions, and/or the like. Each feature vector may include a plurality of features based on the event data. Generating the plurality of feature vectors may include aggregating, for each respective feature vector, a plurality of values of each feature during a subperiod associated with the respective feature vector. In some non-limiting embodiments or aspects, event data may include transaction data, and aggregated feature values may include, but are not limited to, summed/averaged transaction amounts, summed/averaged transaction counts, summed/averaged transaction items, and/or the like.

At step 606, the feature vectors may be provided as inputs to a set of first RNN models. For example, the modeling server 504 may provide the plurality of feature vectors as inputs to a set of first recurrent neural network (RNN) models. The set of first RNN models may include a first plurality of nodes. The first plurality of nodes may include a plurality of subsets of nodes. Each subset of nodes may be associated with a day and a first RNN model. Each node of a subset of nodes may be associated with a subperiod (e.g., an hour). Providing the plurality of feature vectors as inputs to the set of first RNN models may include providing each feature vector associated with a subperiod as an input to a respective RNN node of a respective first RNN model. Each first RNN model of the set of first RNN models may include a stacked RNN model, wherein each node of the plurality of nodes includes a set of subnodes and each subnode of the set of subnodes is associated with a separate RNN model. An input of a first subnode of the set of subnodes may be a feature vector of the plurality of feature vectors, and an output of a last subnode of the set of subnodes may be a first output of the first outputs. An output of each subnode of the set of subnodes that is not the last subnode may be an input for another subnode of the set of subnodes. Stacked RNN models for the set of first RNN models are further illustrated in FIG. 3, as discussed above.

At step 608, first outputs from the set of first RNN models may be generated. For example, the modeling server 504 may generate first outputs for each RNN node of the set of first RNN models, such as by generating a hidden layer feature vector for a hidden layer of each RNN node based on a feature vector that was provided as an input to a respective RNN node. Each of the first outputs may include the hidden layer feature vector.

At step 610, the first outputs may be merged. For example, the modeling server 504 may merge the first outputs for each same subperiod (e.g., a same hour, such as 1 PM to 2 PM, but need not align exactly with each new hour), to form aggregated time-series layers. Each of the aggregated time-series layers may be associated with a subperiod.

At step 612, the aggregated time-series layers may be provided as an input to a second RNN model. For example, the modeling server 504 may provide the aggregated time-series layers as an input to a second RNN model. The second RNN model may include a second plurality of nodes. Each node of the second plurality of nodes may be associated with a subperiod. Providing the aggregated time-series layers as an input to the second RNN model may include providing each of the aggregated time-series layers as an input to a respective RNN node. The second RNN model may include a shrinking stacked RNN model, wherein a dimension of the final outputs is gradually reduced with each successively generated final output. An example of a shrinking stacked RNN model is illustrated in FIG. 4, as discussed above.

At step 614, the final outputs from the second RNN model may be generated. For example, the modeling server 504 may generate final outputs for each RNN node of the second RNN model, such as by generating a final hidden layer feature vector for a hidden layer of each RNN node of the second RNN model based on one of the aggregated time-series layers that was provided as an input to a respective RNN node. Each of the final outputs may include a final hidden layer feature vector.

Figure 7:
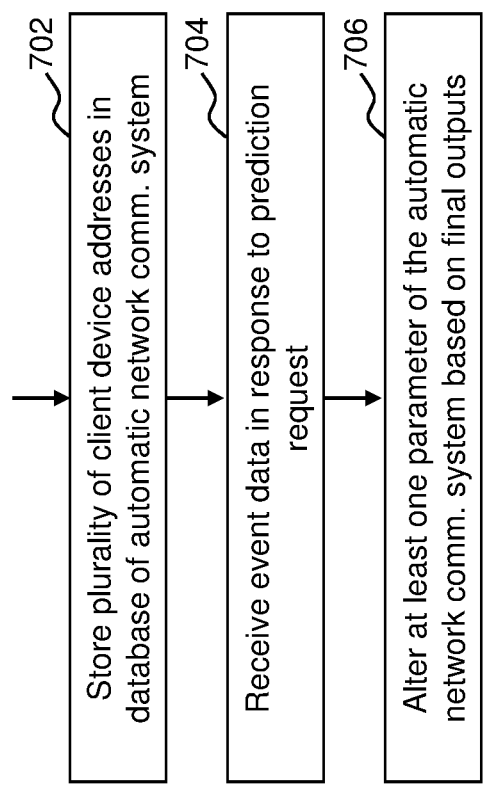
FIG. 7 is a process diagram according to a non-limiting embodiment or aspect of a system and method for multivariate event prediction using multi-stream RNN.

With specific reference to FIG. 7, and in some non-limiting embodiments or aspects, provided is a process 700 for multivariate event prediction using multi-stream RNN. One or more steps of process 700 may be performed (e.g., completely, partially, and/or the like) by transaction processing system 502, merchant system 503, modeling server 504, automatic network communication system 506, and/or fraud detection system 509. In some non-limiting embodiments or aspects, one or more of the steps of process 700 may be performed (e.g., completely, partially, and/or the like) by another device or group of devices separate from and/or including transaction processing system 502, merchant system 503, modeling server 504, automatic network communication system 506, and/or fraud detection system 509.

At step 702, a plurality of client device addresses may be stored. For example, the automatic network communication system 506 may store a plurality of client device 508 addresses in a database of the automatic network communication system 506. The addresses may include one or more unique identifiers (e.g., phone numbers, email addresses, etc.) associated with the client device 508 that are provided to allow communication between the automatic network communication system 506 and the client device 508 in a channel of the communication network 510.

At step 704, event data may be received in response to a prediction request. For example, the modeling server 504 may receive the event data in the sample time period in response to a prediction request from the automatic network communication system 506. The prediction request may include a communication from the automatic network communication system 506 to the modeling server 504 in a channel of the communication network 510, the prediction request being configured to cause the modeling server 504 to generate and/or communicate a prediction of future event data.

At step 706, at least one parameter of the automatic network communication system 506 may be altered. For example, the automatic network communication system 506 may alter at least one parameter associated with sending communications to at least one of the plurality of client device addresses in a second time period after the sample time period, based on the final outputs. Parameters associated with communications may include, but are not limited to, content of communication, time of communication, frequency of communications, address of client device, a decision to send a communication, and/or the like.

Figure 8:
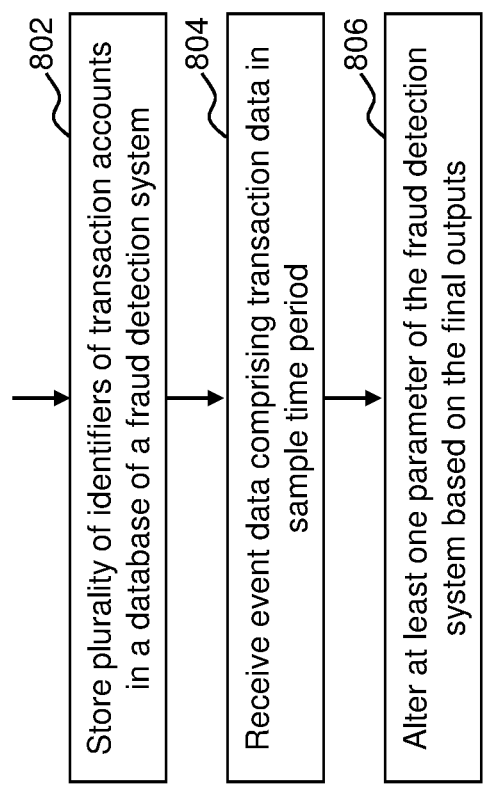
FIG. 8 is a process diagram according to a non-limiting embodiment or aspect of a system and method for multivariate event prediction using multi-stream RNN.

With specific reference to FIG. 8, and in some non-limiting embodiments or aspects, provided is a process 800 for multivariate event prediction using multi-stream RNN. One or more steps of process 800 may be performed (e.g., completely, partially, and/or the like) by transaction processing system 502, merchant system 503, modeling server 504, automatic network communication system 506, and/or fraud detection system 509. In some non-limiting embodiments or aspects, one or more of the steps of process 800 may be performed (e.g., completely, partially, and/or the like) by another device or group of devices separate from and/or including transaction processing system 502, merchant system 503, modeling server 504, automatic network communication system 506, and/or fraud detection system 509.

At step 802, a plurality of identifier of transaction accounts may be stored. For example, a fraud detection system 509 of the transaction processing system 502 may store a plurality of identifiers of transaction accounts in a database of the fraud detection system 509. The plurality of identifiers may include a unique account identifier for each of a plurality of transaction accounts.

At step 804, the event data in a sample time period may be received in response to a prediction request. For example, the modeling server 504 may receive a prediction request from the fraud detection system 509. The event data may include transaction data of completed transactions associated with the transaction accounts for which account identifiers are stored. The prediction request may include a communication from the fraud detection system 509 to the modeling server 504 in a channel of the communication network 510, the prediction request being configured to cause the modeling server 504 to generate and/or communicate a prediction of future event data.

At step 806, at least one parameter of the fraud detection system 509 may be altered. For example, the fraud detection system 509 may alter one or more parameters based on the final outputs of the second RNN model. Parameters of the fraud detection system 509 may include, but are not limited to, transaction account or merchant transaction volume thresholds for executing fraud prevention processes, authorized transaction accounts, unauthorized transaction accounts, authorized merchants, unauthorized merchants, transaction value limit thresholds for executing fraud prevention processes, transaction count thresholds for merchants or transaction accounts for executing fraud prevention processes, parameters of an automatic network communication system 506 for transmitting fraud alerts, and/or the like.

Figure 9:
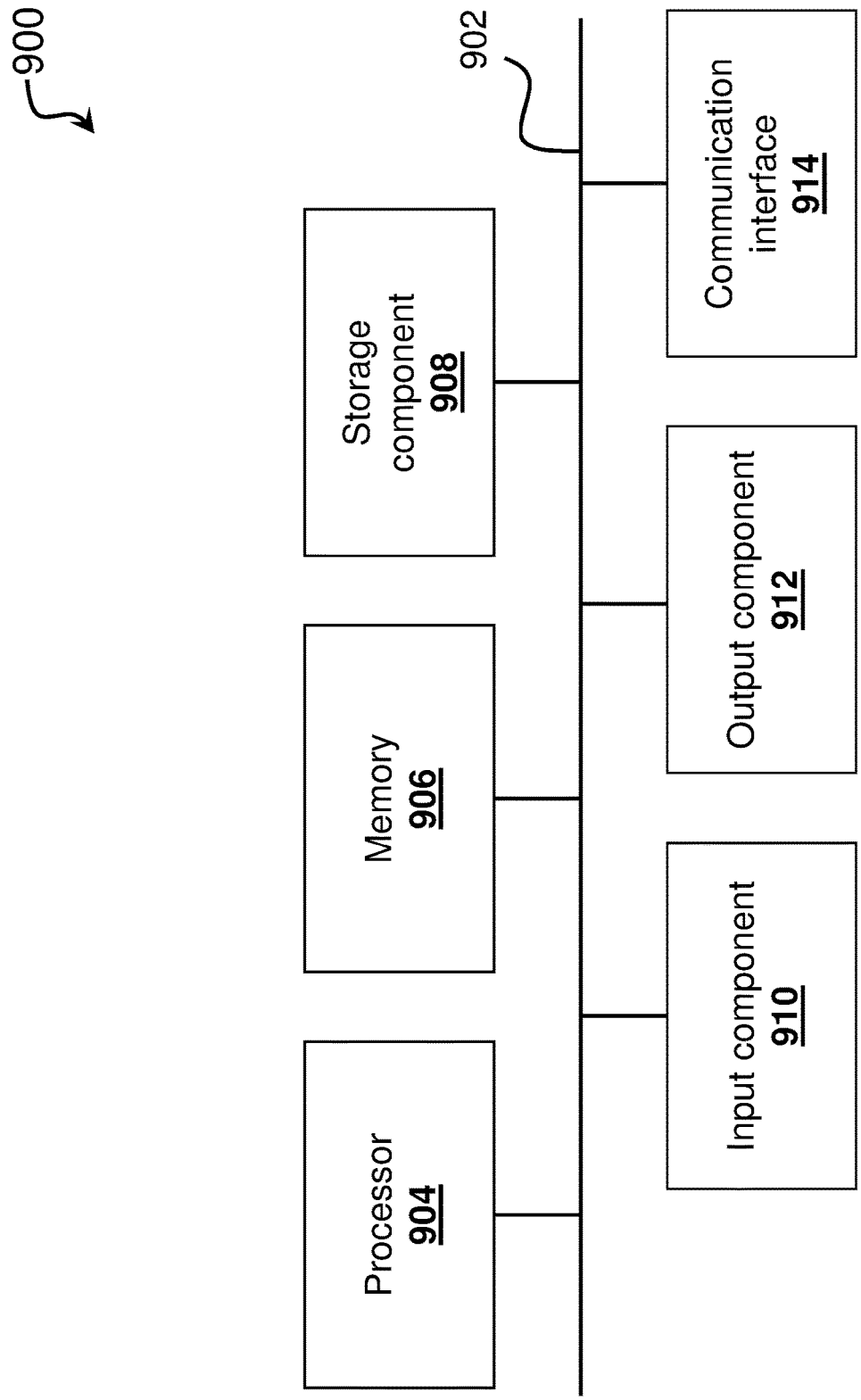
FIG. 9 is a diagram of a non-limiting embodiment or aspect of components of one or more devices of FIG. 5.

Referring now to FIG. 9, FIG. 9 is a diagram of example components of a device 900. Device 900 may correspond to transaction processing system 502 (e.g., one or more devices of transaction processing system 502), merchant system 503 (e.g., one or more devices of merchant system 503), modeling server 504 (e.g., one or more devices of modeling server 504), automatic network communication system 506 (e.g., one or more devices of automatic network communication system 506), client device 508 (e.g., one or more devices of client device 508), and/or fraud detection system 509 (e.g., one or more devices of fraud detection system 509). Transaction processing system 502, merchant system 503, modeling server 504, automatic network communication system 506, client device 508, and/or fraud detection system 509 may include at least one device 900 and/or at least one component of device 900. As shown in FIG. 9, device 900 may include bus 902, processor 904, memory 906, storage component 908, input component 910, output component 912, and communication interface 914.

Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 906 may include random access memory (RAM), read only memory (ROM), and/or another type of dynamic or static storage memory (e.g., flash memory, magnetic memory, optical memory, and/or the like) that stores information and/or instructions for use by processor 904.

Storage component 908 may store information and/or software related to the operation and use of device 900. For example, storage component 908 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 910 may include a component that permits device 900 to receive information, such as via user input (e.g., a touch screen display, a keyboard, a keypad, a mouse, a button, a switch, a microphone, a biometric sensor, and/or the like). Additionally, or alternatively, input component 910 may include a sensor for sensing information (e.g., a global positioning system (GPS) component, an accelerometer, a gyroscope, an actuator, and/or the like). Output component 912 may include a component that provides output information from device 900 (e.g., a display, a speaker, one or more light-emitting diodes (LEDs), and/or the like).

Communication interface 914 may include a transceiver-like component (e.g., a transceiver, a separate receiver and transmitter, and/or the like) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 9 are provided as an example. In some non-limiting embodiments, device 900 may include additional components, fewer components, different components, or differently arranged components than those shown in FIG. 9. Additionally or alternatively, a set of components (e.g., one or more components) of device 900 may perform one or more functions described as being performed by another set of components of device 900.

Experimentation

We organized four different trial datasets where each dataset consisted of merchants from one of the following categories: department store, restaurants, sport facility, and medical service. For each category, we randomly selected 2,000 merchants from California. The time series were produced by computing the hourly aggregation of the following statistics: number of approved transactions, number of unique cards, sum of transaction amount, and rate of approved transactions. The training data consisted of time series from Nov. 1, 2018, to Nov. 23, 2018; and the test data consisted of time series from Nov. 24, 2018, to Nov. 30, 2018. The experimental goal was to predict the next 24 hours of event data feature values given the last 168 hours (e.g., seven days). We predicted each 24 hours in the test data by supplying the latest 168 hours to the system. For example, the transaction data of 168 hours in Week 10 was used to predict the values of 24 hours on the Monday of Week 11.

With respect to model parameters of the model described above, in the recurrent layers, we used 256 as the number of dimensions. Based on our experiments, we choose sigmoid as the activation function of the input RNN layers and ReLU as the activation function of the output RNN layers. We used RMSProp with a learning rate of 0.001 as the optimizer. Batch size was set to 256 as a balance between computing resource utilization and model quality. We chose r=2 and m=4 in Formula 5 (see above) for the experiments using Shrink Stacked RNN output layers. The maximum number of training epochs was 100 and early stopping with a patience of 5 was used to avoid overfitting.

The training goal was to minimize the mean square error between the predicted and true values of the features $v_k^{(t)}$ of the next 24 hours within a mini-batch. The training goal may be written as:

Formula 6

$$\frac{1}{n}\sum_{i=1}^{n}\sum_{k=1}^{4}\sum_{t=0}^{23}(v_k^{(t)} - \hat{v}_k^{(t)})$$

where k=1, ..., 4 represents the four features, and t=0, ..., 23 represents the 24 hour period. The proposed model was compared to a number of prediction methods, including linear model, nearest neighbor, random forest, and RNN algorithms.

Linear model predicts a value by linearly combining the input vector. Since we predicted the four features for the next 24 hours (e.g., 96 values total), we trained 96 linear models and each model predicted one value. The input to each of the models was a 672-sized vector consisting of the four time series from the last 168 hours. We tested linear model under both L2-regularized and non-regularized settings. When L2-regularization was used, the parameter associated with the strength of regularization was found using three-fold cross-validation.

Nearest neighbor is another method for solving regression problems. It predicts the future by finding the nearest neighbor of the current time series from the past. Once the nearest neighbor is located, the next 24 hours of the nearest neighbor can be used as the prediction of the current time series.

Random forest is an ensemble method utilizing both bootstrap aggregating and random subspace methods for training a set of decision trees. The input to the model was once again a 679-sized vector consisting of the four time series from the last 168 hours, and the output of the model was a 96-sized vector consisting of the four time series for the next 24 hours. The hyper-parameters associated with random forest were found based on the estimated error of three-fold cross-validation.

RNN is an artificial neural network model for modeling sequence data. We used one or two layers of RNN to encode the input time series, then we used a Multi-layer Perceptron (MLP) to predict the time series for the next 24 hours. We tested the model with both long short-term memory (LSTM) and gated recurrent unit (GRU) recurrent architecture.

We evaluated the proposed model and the baseline methods (described above) on the four prepared datasets. In addition to the more conventional root mean square error (RMSE), we also measured the performance in normalized RMSE. We computed normalized RMSE by z-normalizing each dimension of the predicted time series before computing the RMSE. Such performance measurement focuses on how much the shape of the predicted time series is different than the ground truth time series. The experiment result is summarized in FIG. 10. For the proposed model, we tested the performance with either 1-layer LSTM or 1-layer GRU.

When only the baseline methods are considered, a simple L2-regularized linear model outperformed all the other non-deep learning-based methods and may be comparable to deep learning-based methods in averaged RMSE. For averaged normalized RMSE, random forest outperformed all other baseline methods, even the RNN-based solution, which may provide an alternative view on the predictions provided by different methods. Nevertheless, both the averaged RMSE and averaged normalized RMSE suggested that the proposed model of multi-stream RNN (MS-RNN) with either LSTM or GRU outperformed all baseline methods. When we looked closely at the result of each individual merchant type for RMSE, MS-RNN outperformed the RNN on two out of four merchant types. On the contrary, for normalized RMSE, MS-RNN outperformed the RNN on three out of four merchant types. Coupled with the fact that the improvement in RMSE is 3.4% while the improvement in normalized RMSE is 5.4%, MS-RNN is more capable of modeling the shape of the time series as compared to the RNN method. Such improvement may be attributed to the model architecture as the multi-stream design helps the model adapt more to the details of the input time series.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for multivariate event prediction, comprising:
    receiving, with at least one processor, event data associated with a plurality of events occurring in a sample time period, the sample time period comprising a plurality of days and each day comprising a plurality of subperiods;
    generating, with at least one processor, a plurality of feature vectors for each day, wherein each feature vector is associated with a subperiod of a day, wherein each feature vector comprises a plurality of features based on the event data, wherein generating the plurality of feature vectors comprises aggregating, for each respective feature vector, a plurality of values of each feature during a subperiod associated with the respective feature vector;
    providing, with at least one processor, the plurality of feature vectors as inputs to a set of first recurrent neural network (RNN) models, wherein the set of first RNN models comprises a first plurality of nodes, wherein the first plurality of nodes comprises a plurality of subsets of nodes, wherein each subset of nodes is associated with a day and a first RNN model of the set of first RNN models, wherein each node of a subset of nodes is associated with a subperiod, wherein providing the plurality of feature vectors as inputs to the set of first RNN models comprises providing each feature vector associated with a subperiod as an input to a respective RNN node of a respective first RNN model;
    generating, with at least one processor, first outputs for each RNN node of the set of first RNN models, wherein generating each of the first outputs comprises generating a hidden layer feature vector for a hidden layer of each RNN node based on a feature vector that was provided as an input to a respective RNN node, wherein each of the first outputs comprises the hidden layer feature vector;
    merging, with at least one processor, the first outputs for each same subperiod of the plurality of subperiods to form aggregated time-series layers, wherein each of the aggregated time-series layers is associated with a subperiod;
    providing, with at least one processor, the aggregated time-series layers as an input to a second RNN model, wherein the second RNN model comprises a second plurality of nodes, wherein each node of the second plurality of nodes is associated with a subperiod, wherein providing the aggregated time-series layers as an input to the second RNN model comprises providing each of the aggregated time-series layers as an input to a respective RNN node; and
    generating, with at least one processor, final outputs for each RNN node of the second RNN model, wherein generating each of the final outputs comprises generating a final hidden layer feature vector for a hidden layer of each RNN node of the second RNN model based on one of the aggregated time-series layers that was provided as an input to a respective RNN node, wherein each of the final outputs comprises the final hidden layer feature vector.

2. The computer-implemented method of claim 1, wherein the subperiod comprises an hour and the plurality of subperiods comprises twenty-four hours in a day.

3. The computer-implemented method of claim 1, further comprising:
    storing, with at least one processor, a plurality of client device addresses in a database of an automatic network communication system;
    receiving, with at least one processor, the event data in the sample time period in response to a prediction request from the automatic network communication system; and
    altering, with at least one processor, at least one parameter of the automatic network communication system associated with sending communications to at least one of the plurality of client device addresses in a second time period after the sample time period based on the final outputs.

4. The computer-implemented method of claim 1, wherein the event data comprises transaction data, and wherein receiving the event data comprises receiving transaction data from a transaction processing system.

5. The computer-implemented method of claim 4, wherein the plurality of features based on the event data comprises at least one of the following: transaction amount; transaction count; items per transaction; or any combination thereof.

6. The computer-implemented method of claim 4, further comprising:
    storing, with at least one processor, a plurality of identifiers of transaction accounts in a database of a fraud detection system of the transaction processing system;
    receiving, with at least one processor, the event data in the sample time period in response to a prediction request from the fraud detection system, wherein the event data comprises transaction data of completed transactions associated with the transaction accounts; and
    altering, with at least one processor, at least one parameter of the fraud detection system based on the final outputs.

7. The computer-implemented method of claim 1, wherein each first RNN model of the set of first RNN models comprises a stacked RNN model, wherein each node of the plurality of nodes comprises a set of subnodes, wherein each subnode of the set of subnodes is associated with a separate RNN model, wherein an input of a first subnode of the set of subnodes is a feature vector of the plurality of feature vectors, wherein an output of a last subnode of the set of subnodes is a first output of the first outputs, and wherein an output of each subnode of the set of subnodes that is not the last subnode is an input for another subnode of the set of subnodes.

8. The computer-implemented method of claim 1, wherein the second RNN model comprises a shrinking stacked RNN model, wherein a dimension of the final outputs is gradually reduced with each successively generated final output.

9. A system for multivariate event prediction, the system comprising a server including at least one hardware processor for executing program instructions, the server being programmed and/or configured to:
receive event data associated with a plurality of events occurring in a sample time period, the sample time period comprising a plurality of days and each day comprising a plurality of subperiods;
generate a plurality of feature vectors for each day, wherein each feature vector is associated with a subperiod of a day, wherein each feature vector comprises a plurality of features based on the event data, wherein generating the plurality of feature vectors comprises aggregating, for each respective feature vector, a plurality of values of each feature during a subperiod associated with the respective feature vector;
provide the plurality of feature vectors as inputs to a set of first recurrent neural network (RNN) models, wherein the set of first RNN models comprises a first plurality of nodes, wherein the first plurality of nodes comprises a plurality of subsets of nodes, wherein each subset of nodes is associated with a day and a first RNN model of the set of first RNN models, wherein each node of a subset of nodes is associated with a subperiod, wherein providing the plurality of feature vectors as inputs to the set of first RNN models comprises providing each feature vector associated with a subperiod as an input to a respective RNN node of a respective first RNN model;
generate first outputs for each RNN node of the set of first RNN models, wherein generating each of the first outputs comprises generating a hidden layer feature vector for a hidden layer of each RNN node based on a feature vector that was provided as an input to a respective RNN node, wherein each of the first outputs comprises the hidden layer feature vector;
merge the first outputs for each same subperiod of the plurality of subperiods to form aggregated time-series layers, wherein each of the aggregated time-series layers is associated with a subperiod;
provide the aggregated time-series layers as an input to a second RNN model, wherein the second RNN model comprises a second plurality of nodes, wherein each node of the second plurality of nodes is associated with a subperiod, wherein providing the aggregated time-series layers as an input to the second RNN model comprises providing each of the aggregated time-series layers as an input to a respective RNN node; and
generate final outputs for each RNN node of the second RNN model, wherein generating each of the final outputs comprises generating a final hidden layer feature vector for a hidden layer of each RNN node of the second RNN model based on one of the aggregated time-series layers that was provided as an input to a respective RNN node, wherein each of the final outputs comprises the final hidden layer feature vector.

10. The system of claim 9, wherein the server is further programmed and/or configured to:
store a plurality of client device addresses in a database of an automatic network communication system;
receive the event data in the sample time period in response to a prediction request from the automatic network communication system; and
alter at least one parameter of the automatic network communication system associated with sending communications to at least one of the plurality of client device addresses in a second time period after the sample time period based on the final outputs.

11. The system of claim 9, wherein the event data comprises transaction data, wherein receiving the event data comprises receiving transaction data from a transaction processing system, and wherein the plurality of features based on the event data comprises at least one of the following: transaction amount; transaction count; items per transaction; or any combination thereof.

12. The system of claim 11, wherein the server is further programmed and/or configured to:
store a plurality of identifiers of transaction accounts in a database of a fraud detection system of the transaction processing system;
receive the event data in the sample time period in response to a prediction request from the fraud detection system, wherein the event data comprises transaction data of completed transactions associated with the transaction accounts; and
alter at least one parameter of the fraud detection system based on the final outputs.

13. The system of claim 9, wherein each first RNN model of the set of first RNN models comprises a stacked RNN model, wherein each node of the plurality of nodes comprises a set of subnodes, wherein each subnode of the set of subnodes is associated with a separate RNN model, wherein an input of a first subnode of the set of subnodes is a feature vector of the plurality of feature vectors, wherein an output of a last subnode of the set of subnodes is a first output of the first outputs, and wherein an output of each subnode of the set of subnodes that is not the last subnode is an input for another subnode of the set of subnodes.

14. The system of claim 9, wherein the second RNN model comprises a shrinking stacked RNN model, wherein a dimension of the final outputs is gradually reduced with each successively generated final output.

15. A computer program product for multivariate event prediction, the computer program product comprising at least one non-transitory computer-readable medium including program instructions that, when executed by at least one processor, cause the at least one processor to:
receive event data associated with a plurality of events occurring in a sample time period, the sample time period comprising a plurality of days and each day comprising a plurality of subperiods;
generate a plurality of feature vectors for each day, wherein each feature vector is associated with a subperiod of a day, wherein each feature vector comprises a plurality of features based on the event data, wherein generating the plurality of feature vectors comprises aggregating, for each respective feature vector, a plurality of values of each feature during a subperiod associated with the respective feature vector;

provide the plurality of feature vectors as inputs to a set of first recurrent neural network (RNN) models, wherein the set of first RNN models comprises a first plurality of nodes, wherein the first plurality of nodes comprises a plurality of subsets of nodes, wherein each subset of nodes is associated with a day and a first RNN model of the set of first RNN models, wherein each node of a subset of nodes is associated with a subperiod, wherein providing the plurality of feature vectors as inputs to the set of first RNN models comprises providing each feature vector associated with a subperiod as an input to a respective RNN node of a respective first RNN model;

generate first outputs for each RNN node of the set of first RNN models, wherein generating each of the first outputs comprises generating a hidden layer feature vector for a hidden layer of each RNN node based on a feature vector that was provided as an input to a respective RNN node, wherein each of the first outputs comprises the hidden layer feature vector;

merge the first outputs for each same subperiod of the plurality of subperiods to form aggregated time-series layers, wherein each of the aggregated time-series layers is associated with a subperiod;

provide the aggregated time-series layers as an input to a second RNN model, wherein the second RNN model comprises a second plurality of nodes, wherein each node of the second plurality of nodes is associated with a subperiod, wherein providing the aggregated time-series layers as an input to the second RNN model comprises providing each of the aggregated time-series layers as an input to a respective RNN node; and generate final outputs for each RNN node of the second RNN model, wherein generating each of the final outputs comprises generating a final hidden layer feature vector for a hidden layer of each RNN node of the second RNN model based on one of the aggregated time-series layers that was provided as an input to a respective RNN node, wherein each of the final outputs comprises the final hidden layer feature vector.

16. The computer program product of claim 15, wherein the program instructions further cause the at least one processor to:

store a plurality of client device addresses in a database of an automatic network communication system;

receive the event data in the sample time period in response to a prediction request from the automatic network communication system; and alter at least one parameter of the automatic network communication system associated with sending communications to at least one of the plurality of client device addresses in a second time period after the sample time period based on the final outputs.

17. The computer program product of claim 15, wherein the event data comprises transaction data, wherein receiving the event data comprises receiving transaction data from a transaction processing system, and wherein the plurality of features based on the event data comprises at least one of the following: transaction amount; transaction count; items per transaction; or any combination thereof.

18. The computer program product of claim 17, wherein the program instructions further cause the at least one processor to:

store a plurality of identifiers of transaction accounts in a database of a fraud detection system of the transaction processing system;

receive the event data in the sample time period in response to a prediction request from the fraud detection system, wherein the event data comprises transaction data of completed transactions associated with the transaction accounts; and alter at least one parameter of the fraud detection system based on the final outputs.

19. The computer program product of claim 15, wherein each first RNN model of the set of first RNN models comprises a stacked RNN model, wherein each node of the plurality of nodes comprises a set of subnodes, wherein each subnode of the set of subnodes is associated with a separate RNN model, wherein an input of a first subnode of the set of subnodes is a feature vector of the plurality of feature vectors, wherein an output of a last subnode of the set of subnodes is a first output of the first outputs, and wherein an output of each subnode of the set of subnodes that is not the last subnode is an input for another subnode of the set of subnodes.

20. The computer program product of claim 15, wherein the second RNN model comprises a shrinking stacked RNN model, wherein a dimension of the final outputs is gradually reduced with each successively generated final output.

* * * * *